United States Patent
Fabian et al.

(10) Patent No.: US 7,049,972 B2
(45) Date of Patent: May 23, 2006

(54) LIGHTNING STRIKE HAZARD DETECTOR

(76) Inventors: Carl E. Fabian, 577 NE. 96th St., Miami Shores, FL (US) 33138; Dave Narasimhan, 6 Summit Trail, Flemington, NJ (US) 08822

( * ) Notice: Subject to any disclaimer, the term of this patent is extended or adjusted under 35 U.S.C. 154(b) by 58 days.

(21) Appl. No.: 10/651,373

(22) Filed: Aug. 29, 2003

(65) Prior Publication Data
US 2005/0046574 A1    Mar. 3, 2005

(51) Int. Cl.
*G01W 1/00* (2006.01)

(52) U.S. Cl. .................... 340/601; 73/170.24; 324/72; 340/660; 340/693.5

(58) Field of Classification Search ............... 340/601, 340/660, 693.5, 691.2, 691.4, 691.6; 324/72; 73/170.24; 702/4
See application file for complete search history.

(56) References Cited

U.S. PATENT DOCUMENTS

| | | | |
|---|---|---|---|
| 3,452,346 A | 6/1969 | Kupersmit | 340/657 |
| 3,745,412 A | 7/1973 | Ruff | 361/220 |
| 3,891,919 A | 6/1975 | Penninger | 324/72 |
| 4,007,418 A | 2/1977 | Hanna | 324/72 |
| 4,649,374 A | 3/1987 | Hoigaard | 340/573.1 |
| 4,714,915 A | 12/1987 | Hascal et al. | 340/657 |
| 4,785,294 A | 11/1988 | Campbell et al. | 340/649 |
| 4,983,954 A | 1/1991 | Huston | 340/657 |
| 5,057,820 A | 10/1991 | Markson et al. | 340/600 |
| 5,140,523 A * | 8/1992 | Frankel et al. | 340/601 |
| 5,263,368 A | 11/1993 | Breitmeier et al. | 73/170.24 |
| 5,296,842 A * | 3/1994 | Kato | 340/601 |
| 5,359,319 A | 10/1994 | Campbell et al. | 340/649 |
| 5,457,596 A | 10/1995 | Yang | 361/220 |
| 5,461,369 A | 10/1995 | Campbell et al. | 340/649 |
| 5,541,501 A * | 7/1996 | Shaver et al. | 324/72 |
| 5,621,410 A * | 4/1997 | Gray et al. | 342/26 R |
| 5,772,445 A | 6/1998 | Mousaa | 434/301 |
| 6,150,945 A | 11/2000 | Wilson | 340/661 |
| 6,405,134 B1 * | 6/2002 | Smith et al. | 702/4 |
| 6,590,529 B1 * | 7/2003 | Schwoegler | 342/357.13 |
| 6,828,911 B1 * | 12/2004 | Jones et al. | 340/601 |

* cited by examiner

*Primary Examiner*—Thomas Mullen
(74) *Attorney, Agent, or Firm*—Ernest D. Buff & Associates, LLC; Ernest D. Buff; Dave Narasimhan

(57) ABSTRACT

An accurate, fast-acting, wearable lightning strike hazard detector has a plurality of collecting plates for collection of arriving charged particles. The collecting plates are insulated from each other by an insulating mechanism. A connecting mechanism electrically connects the collecting plates to a bleeding circuit to bleed accumulated charges to a ground plane. The voltage within the bleeding circuit is determined by a voltage measuring mechanism. A voltage accumulation mechanism measures the accumulated voltage of each plate and its rate of voltage accumulation as a function of time. Voltage accumulation and voltage/time data are interpreted by an algorithm to determine lightning strike potential. A signal generating mechanism connected to the algorithm mechanism generates a signal when said voltage accumulation and voltage accumulation rate exceed preselected limits. The signal actuates an alarm mechanism, which provides an audible or visual alarm to warn against an impending lightning strike. Plural detector pairs are, optionally, housed on a bracelet or placed within a wristwatch housing to determine the direction from which a lightning strike hazard is approaching. The detector has an on-board power supply, such as a lithium battery. Its warning signal provides sufficient time to permit the wearer to seek shelter, or assume a low, close to ground, profile that avoids a lightning strike.

13 Claims, 6 Drawing Sheets

LIGHTNING STRIKE HAZARD DETECTOR

BACKGROUND OF THE INVENTION

1. Field of the Invention

The present invention relates to electrostatic monitoring devices for warning against atmospheric electrical gradients such as electrical storms; and more particularly, to a wearable lightning hazard device which detects and provides an audible warning in the event of approaching electrically charged thunderstorms with potential for lightning strikes.

2. Description of the Prior Art

People can be struck by lightning when they are involved in outdoor activities such as golfing, fishing and other recreational activities on an overcast day. It is difficult, from a practical standpoint, to predict lightning hazard potential since no visible clue is available to indicate the hazard. The presence of a nearby thunderstorm and lightning activity provides little or no indication concerning lightning hazard potential for individuals within the storm locus.

Various elements of high voltage and electrical charge detection methods are known in the art. These elements have found use in connection with detection schemes for signaling the approach of thunderstorms; detection of nearly proximate high tension wires to prevent shock hazard; detection of friction induced body charges which may damage electronic circuits; and protection of the wearer from accumulating excess static charge which may destroy electronic circuits.

U.S. Pat. No. 3,891,919 to Penninger discloses a storm lightning detector, which uses radio frequency signals emitted by the lightning flashes during a thunderstorm. Two AM receivers are tuned to different frequencies. A lightning flash concurrently generates noise in each of the AM receiver signals—a wide band transmission of noise—that is unlike other common AM disturbances. This disturbance created in two different AM frequencies is used to detect the presence of lightning. The closer the lightning flash is to the detector, the larger becomes the disturbance in the AM signals of the detector's receivers. A warning signal provided by the Penninger device is said to provide significant reaction time, since atmospheric disturbance produced by a lightning streamer travels several kilometers. While the Penninger device is useful for detecting far away lightning strikes, an imminent lightning strike is not detected until it has already occurred.

U.S. Pat. No. 5,057,820 to Markson et al. discloses an optical warning system. An optical detector identifies the presence of lightning or a strobe light from another aircraft, so that collision can be avoided. The strobe light is identified by its periodicity, while lightening is identified by its nonperiodic behavior. Two or more detectors can localize the lightening or a strobe light. An RF detector may be added together with the optical system to verify the presence of lightening. The device is useful for identifying inter-cloud lightning even in bright daylight. This device is not adapted to be worn by the user. It detects lightning strikes after they occur and provides no detection against an imminent lightning hazard.

U.S. Pat. No. 5,263,368 to Breitmeier et al. discloses a hand-held lightning detection and ranging device. Radio frequency emissions from lightning are picked up by an antenna and filtered to select low frequency emissions. The filtered signal is compared against a standard to activate light emitting diodes that are said to indicate lighting disturbance at 0–10 miles distance and 10–20 miles distance. The frequencies utilized are 700 Hz, which represents a lightning disturbance of 10–20 miles distance, and 1400 Hz, which represents a 0–10 mile distance lightning disturbance. Breitmeier's device detects far-away lightning events. Detection of lightning strikes follows their occurrence. The Bregmeier device is incapable of detecting an imminent lightning strike hazard before it occurs.

U.S. Pat. No. 4,007,418 to Hanna discloses a personal electrostatic safety monitor having an induction plate sensing means. A plate isolated by two capacitors is connected to a positive preamplifier and a negative preamplifier. The leakage current and voltage are amplified to determine the rate of power dissipation so that a hazard potential can be established. High power dissipation rate is indicative of danger. Column 4 lines 10–12 of the Hanna patent describes use of the personal electrostatic safety monitor in atmospheric electrical gradients such as electrical storms. When high power dissipation is observed by the Hanna device, accumulation of negative charges is already substantial and will likely initiate a lightning strike, since the threshold value required by the device is based on the quantity of dissipation that is safe for humans to endure. Once this high charge value accumulates, a subsequent high voltage strike is probable owing to the state of charge accumulation. Consequently, any warning provided by the Hanna device arrives too late to avoid a lightning strike, which can even be initiated by the device, itself.

U.S. Pat. No. 4,714,915 to Hascal et al. discloses a portable electrostatic field safety monitor. The patent discloses a portable electrostatic field safety monitor for use by linemen who work on high voltage power lines. It provides an audible alarm when an electrostatic field beyond a set value is detected. An induction plate coupled to the AC current flowing through the power lines measures a DC voltage against a floating ground to detect the presence of high voltage in the power lines. Since the coupling process is inductive, the Hascal et al. device requires an AC field, which is not present in a thunderstorm. Accordingly, the Hascal et al. monitor provides no information concerning lightning hazards.

U.S. Pat. No. 4,983,954 to Huston discloses a shock hazard-warning device. A portable, wrist wearable, warning device becomes coupled with the AC signal transmitted by high-tension electrical wire. Detection of shock hazard potential created when the wearer approaches the high-tension wire is based on a threshold value set in the device. The Huston device is finely tuned, measuring line frequency via narrow band pass filters. It affords AC high voltage detection but cannot detect lightning hazard potential from a thunderstorm cloud.

U.S. Pat. No. 3,452,346 to Kupersmit, discloses a static charge detector, which uses two sets of circuitry to detect positive or negative charge. It uses a neon light to bleed the charges through a high resistance, thereby preventing damage to measurement circuits. The presence of high voltage generated current through two transistor circuits triggers an oscillator circuit, which produces an audible alarm. The Kupersmit patent discloses use of a single wire to collect positive or negative charges. Accordingly, the Kupersmit detector must be placed close to the charge source. It uses bleed circuits to protect the detection circuit from damage and detect the presence of static charge. The patent disclosure suggests no means for detecting the approach of rapidly moving negative charges. No disclosure is contained therein concerning means for warning a person of approaching lightning hazard.

U.S. Pat. No. 4,649,374 to Hoigaard discloses an electrostatic system monitor for determining electrostatic charge potential when assembling electronic IC circuits on a workbench. IC circuits are easily damaged by electrostatic charges, which cause arcing through the silicon oxide layers of the IC, damaging their functionality. The Hoigaard system monitors various operations in a workbench and alarms when electrostatic charge is excessive.

Several US patents to Campbell disclose a static monitoring system for IC fabrication. U.S. Pat. No. 4,785,294 to Campbell discloses that static monitoring is used to check whether the grounding wrist strap in an IC workbench station is properly grounded. The system also checks to determine whether an electrically charged ungrounded person is in dangerously close proximity to the work. An antenna determines whether electrically charged objects are in close proximity, and if so, causes the system to trigger an audible alarm. IC circuits are easily damaged by electrostatic charges. Such charges produce arcing through the silicon oxide layers of the IC, destroying circuit functionality. The system monitors the proper functioning of the ground strap in a work bench and signals an alarm when electrically charged objects moving close to the workbench have potential for applying to IC devices thereon a damaging electrostatic charge that would likely cause device failure. The Campbell device uses physical connections to sources of high voltage, an arrangement that cannot be used to detect approaching electrostatic charges signaling a lightning strike.

U.S. Pat. No. 5,359,319 to Campbell et al. discloses an electrostatic discharge detector and display. An electrostatic discharge in a circuit board, which is being assembled, results in a radio frequency radiation, which is remotely picked up by an electrostatic monitoring system. The system amplifies the antenna-received signal and displays it as a diode, indicating that electrostatic discharge was present during circuit board assembly. Electrostatic discharge is detected after it occurs; no suggestion is provided concerning detection of lightning hazard potential.

U.S. Pat. Nos. 5,461,369 and 5,463,379 to Campbell et al. disclose a wrist-wearable electrostatic discharge detector and display. An electrostatic discharge in a circuit board, which is being assembled, results in RF radiation. The RF radiation is remotely picked up by an electrostatic monitoring system. The system amplifies the antenna-received signal and displays it as a display in a wrist wearable device, indicating that electrostatic discharge was present during circuit board assembly. This wearable system detects electrostatic discharge after it has occurred, but does not detect lightning hazard potential.

U.S. Pat. No. 5,772,445 to Mousaa discloses an electrostatic meter. The device relies on a moving electrostatic field, creating an electromagnetic field, which can be picked up by a solenoid coil as an induced voltage. Disturbances in the electrostatic field are inductively picked up due to movement of charges. For the Mousaa device to work, the user must be very close to large amounts of rapidly moving charged particles. Such close proximity is required by the Maxwell's equations. It significantly diminishes the ability of the Mousaa device to detect charge accumulation from arriving negatively charged particles during onset of lightning activity.

U.S. Pat. No. 6,150,945 to Wilson (hereinafter the '945 patent) discloses a static charge-warning device. The device functions by examining the charge accumulated in two plates, which are separated from each other by a high impedance voltage-measuring device. Tribofriction results in charge accumulation on the body of a user, indicating differences in the potential of the separated plates. When the charge accumulation reaches sufficient magnitude, an alarm is sounded, advising the worker to discharge the accumulated charges before working on electronic IC components. The discharge function is accomplished by the Wilson device without initiation of an arc, so that charge accumulation problems are detected and resolved before electronic IC components become damaged. The Wilson patent thus discloses a warning device, which indicts that a person accumulates excessive charges. It discloses no means for discharging the accumulated charges. The Wilson device would not be suitable for detecting the arrival of negatively charged ions prior to a lightning strike, since voltage accumulated in the plates would greatly exceed the capability of the high impedance volt-meter Wilson uses to form the device's electronic circuit.

U.S. Pat. No. 3,745,412 to Ruff discloses an electrostatic discharge device, which enables a user to discharge static electricity, such as that picked up by walking, without applying an electric shock to the user. This discharge device does not detect arrival of electrostatically charged particles and is not a warning device for lightning hazard potential.

U.S. Pat. No. 5,457,596 to Yang discloses a static electricity protection wrist strap. A wrist-wearable static protection device helps to ground the wrist, thereby eliminating accumulated static charges so that circuit board assembly does not result in component failures. The unit senses variations in the capacitance of the skin with respect to a plate in the device, thereby determining the effectiveness of the grounding strap. The Yang device requires a physical connection to high voltage sources. It is not readily applicable to detection of impending lightning strikes.

There remains a need in the art for a wearable lightning hazard-warning device that indicates a lightning strike hazard potential based on charge accumulation, before the charge accumulation measurement itself triggers a lightning strike.

SUMMARY OF THE INVENTION

The present invention provides a self-contained wearable lightning hazard detector that is accurate and fast acting, and operates in a highly reliable manner, providing sufficient warning time to permit the wearer to seek shelter, or assume a low, close to ground, profile, thereby reducing the chance of being struck by lightning. Rapidly approaching charged elements from a lightning-producing thunderstorm are accumulated and discharged to ground plane by a bleeding circuit without production of lightning initiating streamers. An audible warning signals the user that an impending lightning hazard is imminent. The detector uses parallel collecting plates, which are insulated from each other and connected to a ground plane through a resistor and a capacitor, which constitutes a bleeding circuit. The voltages from each of the collecting plates are connected to a microprocessor circuit, which monitors the accumulated voltage at each plate connected to the bleeding circuit, and the rate of increase of the voltage as a function of time. A voltage measurement taken at the resistor is proportional to the accumulated voltage at the collecting plate, and is low enough to be safely monitored by the microprocessor circuit. When electrical charges from an electrical storm are incident on these bleeding parallel plates, the outermost plates accumulate charge rapidly, while the inner plates accumulate charges at a more moderate rate, indicating the arrival of electrical charges. The bleeding action prevents the accumulation of high voltages at the metallic parallel plates preventing the initiation of a streamer, which might otherwise cause the detector to initiate a lightning strike. The microprocessor triggers an alarm when high voltage and high rate of accumulation are detected, so that the wearer of the device can "hit the ground" avoiding being struck by lightning. The high sensitivity of the detector provides several seconds of warning so that the wearer of the device has time to seek a low profile, ground plane position, by dropping to the ground.

Broadly stated, the invention provides means for detecting the arrival of charged particles in advance of an impending lightning hazard. The quantity and rate of accumulation of electrical charges are detected, thereby determining the lightning strike hazard potential. A bleeding circuit minimizes the quantity of accumulated charge, so that the detector does not, itself, initiate a lightning strike. The bleeding process additionally helps to prevent damage to measurement electronics. The unit is optionally powered by an on-board battery. It can be quite small and is adapted be worn by the user, possibly incorporated into a wristwatch.

When a high voltage wire is approached, the plates will initially charge and thereafter rapidly bleed to zero potential. Accordingly, locating the plates proximate high voltage wires does not trigger the alarm means, or cause a detector response similar to that induced by the approach of charged particles during a thunderstorm.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Lightning strikes people involved in outdoor recreational activities, generally on an overcast day. It strikes the ground many thousands of time each year, predominantly in the summer months, and each year approximately 100 people are killed by lightning in the United States and many more (500 or so) survive the strike but may suffer serious injuries such as burns, paralysis, etc. It is one of the most serious weather-related causes of death and injury in the country. A thunderstorm may approach with little warning and sometimes lightning strikes when no storm is immediately apparent.

It could prove to be highly advantageous for individuals engaged in outdoor activities to have a device which could be worn unobtrusively on the body, like a wristwatch, and would give the wearer advance warning of an impending lightning strike. This would be valuable to people engaged in sports such as golfing, hiking, fishing, as well as many other outdoor activities such as farming, etc. There are many evasive actions that could be taken in a few moments that could substantially lower the likelihood of an individual being struck by lightning, the simplest being merely dropping to the ground.

When a cloud bearing an electrostatic charge, whether negative or positive (but usually negative), on its surface nearest the ground, passes relatively closely over the ground, it will induce an opposite charge on the surface of the ground below, the magnitude of which will be related to the charge on the cloud above. The closer the ground (or objects thereon) to the cloud above, the stronger is the electric field due to the charge accumulation and larger is the lightning strike potential. Therefore high ground will tend to have a stronger electric field than adjacent low ground, and objects projecting prominently above ground level, such as towers or trees, or even individuals, will have a stronger electric field than the adjacent ground. The magnitude of the charge accumulated upon such an object will vary directly with the electrical conductivity of the object, a metal tower generally attaining a higher charge than an adjacent tree of the same height. Said accumulated charge will also not be uniform throughout the object, as the top of a tree will ordinarily attain a stronger induced charge than the bottom of the same tree.

The air gap separating these two opposite charges is a very strong insulator. It normally takes a potential difference of 1000 Volts or more for a charge to spark across an air gap of just a few millimeters. For lightning to discharge between cloud and ground therefore requires an extremely strong potential difference, in the order of millions of Volts.

When this difference in charge between the cloud and ground below becomes great enough to compromise the insulating character of the air gap, break down of the insulating air medium occurs. There occurs a discharge of lightning along the path of least resistance, which is generally the shortest path available, making use of conductors along the way, at which point the two opposite charges suddenly and explosively neutralize one another. Before the opposing charges reach this critical level some time must elapse and this time can be utilized to give advance warning to someone in the vicinity of the building charge.

A phenomenon reported by many individuals finding themselves in the vicinity of a lightning strike is that the hair on their head or arms "stood on end" for some time prior to the strike. This actually represents a form of advance notice of the impending strike caused by the accumulation of electrostatic charge. As demonstrable with a simple foil-leaf electroscope, adjacent foil leaves both bearing the same charge repel one another and therefore move apart. The hairs, analogous to the leaves of the electroscope, being light and movable and bearing a like charge, move away from one another to the degree possible, thus "standing on end".

At some finite time prior to an impending lightning strike, persons in the vicinity are subjected to the buildup of electrostatic charge that generally reaches 1000 to 2000 Volts or more by the time they notice their hair standing on end. Our device, capable of detecting this charge and producing an audible signal, can provide critical advance warning of such a lightning hazard to the wearer and thus provide a time interval in which to take potentially life-saving, evasive action.

Many types of evasive action are possible, depending on circumstances. One may simply drop close to the ground to assume a lower profile. It is important to quickly distance oneself from nearby metal such as golf clubs or farm implements and away from any wires or tall structures such as trees. Alternatively, one could seek nearby shelter if available, release the mast if one is windsurfing, etc.

The present invention provides a wearable, lightning strike hazard detector, which measures the quantity of accumulated charges as well as the rate of accumulation of electrical charges in a plurality of collecting plates to determine the lightning strike hazard potential. Detector functionality will be better understood when the mechanics of lightning and elements, which trigger a lightning strike are appreciated. The assessment of lightning potential differs considerably from the detection of high voltage or presence of electrical charges capable of producing an arc, and is detailed schematically by FIG. 1.

Figure 1:
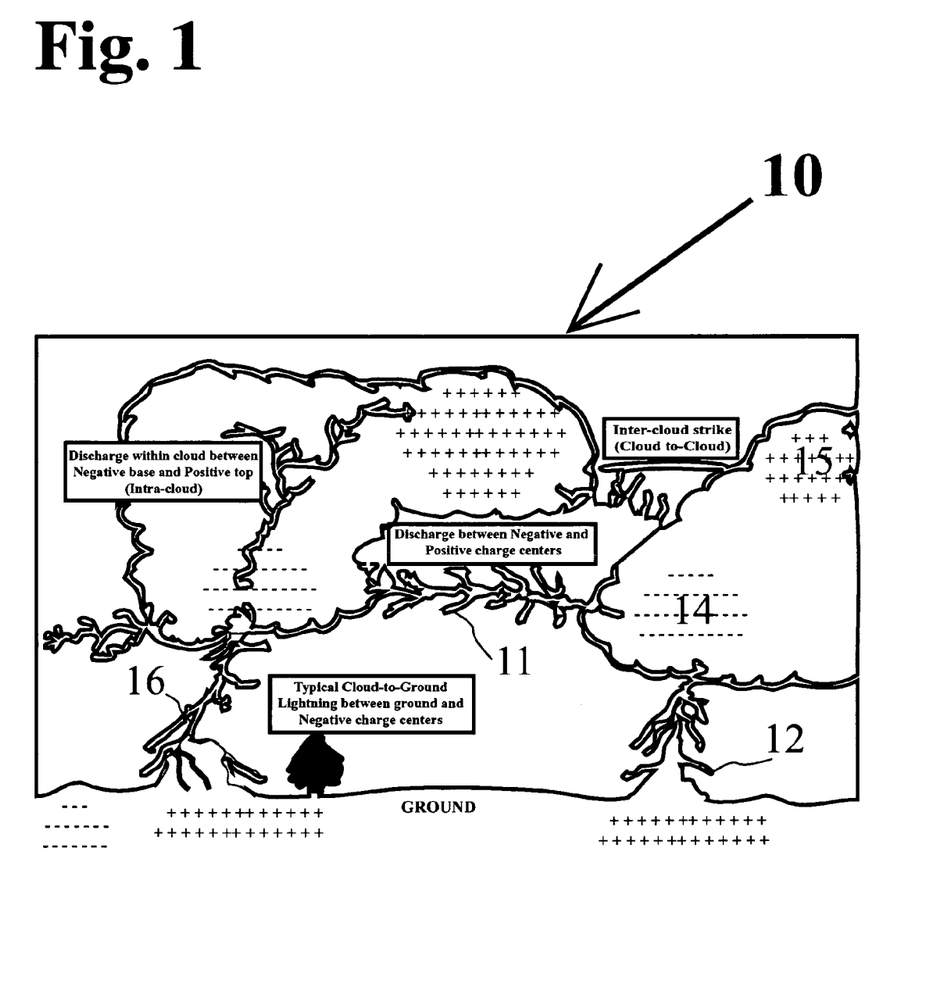
FIG. 1 is a schematic diagram illustrating the origin of lightning strikes and mechanics of charge transfer needed to initiate a lightning strike.

As particles within a cloud (called hydrometeors) grow and interact, some particles become charged, possibly through collisions. Smaller particles tend to acquire positive charges, while larger particles acquire negative charges. These positive and negative particles tend to separate under the influences of updrafts and gravity until the upper portion of the cloud acquires a net positive charge and the lower portion of the cloud becomes negatively charged. The upper portions may contact the ionosphere, discharging the positive charges. Such separation of charge produces enormous electrical potential both within the cloud and between the cloud and ground. This electrical potential oftentimes amounts to millions of volts. Eventually the electrical potential difference reaches the point, where it overcomes the electrical resistance of the air by dielectric breakdown, a flash begins. Lightning, then, is an electrical discharge between positive and negative regions of a thunderstorm. A lightning flash is composed of a series of strokes with an average of about four. The length and duration of each lightning stroke varies; but typically averages about 30 microseconds. (The average peak power per stroke is about 1012 watts.)

With the initial overcoming of the air resistance in a region of strong electric fields, a streamer may begin to propagate downward toward the Earth as shown in FIG. 1 at 10. The streamer moves in discrete steps as shown at 11 of about 50 meters each and is called a stepped leader. As it grows, the stepped leader creates an ionized path depositing charge along a channel. When the stepped leader nears the Earth, a large potential difference is generated between the end of the leader and the Earth. Typically, a streamer is launched from the Earth and intercepts the descending stepped leader just before it reaches the ground. Once a connecting path is achieved, a return stroke flies up the already ionized path at close to the speed of light. This return stroke releases tremendous energy, bright light and thunder. Occasionally, where a thunderstorm grows over a tall Earth-grounded object, such as a radio antenna, an upward leader may propagate from the object toward the cloud. This "ground-to-cloud" flash generally transfers a net positive charge to Earth and is characterized by upward pointing branches 12, as shown in FIG. 1. The lower part of a thundercloud 14 is usually negatively charged. An upward area of the thundercloud 15 is usually positively charged. Lightning from the negatively charged area of the cloud generally carries a negative charge to Earth and is called a negative flash shown at 16. A discharge from a positively charged area to Earth produces a positive flash. Lightning leaders from thunderclouds proceed in steps of tens of meters, electrifying ground-based objects as they approach the earth. Ground-based objects may launch lightning streamers to meet these leaders. Streamers are audible, being said to sound like bacon frying, and visible, causing hair to stand on end. A connecting leader-streamer results in a closed circuit cloud-to-ground lightning flash. Thunder accompanying it is the acoustic shock wave from the electrical discharge. Hence, thunder and lightning are associated with one another. The approaching of negatively charged particles moving at a rapid rate must be detected in time to enable one to crouch to the ground or otherwise assume a low, close-to-ground profile, that prevents streamers reaching a person from intersecting approaching streamers from a cloud.

Figure 2:
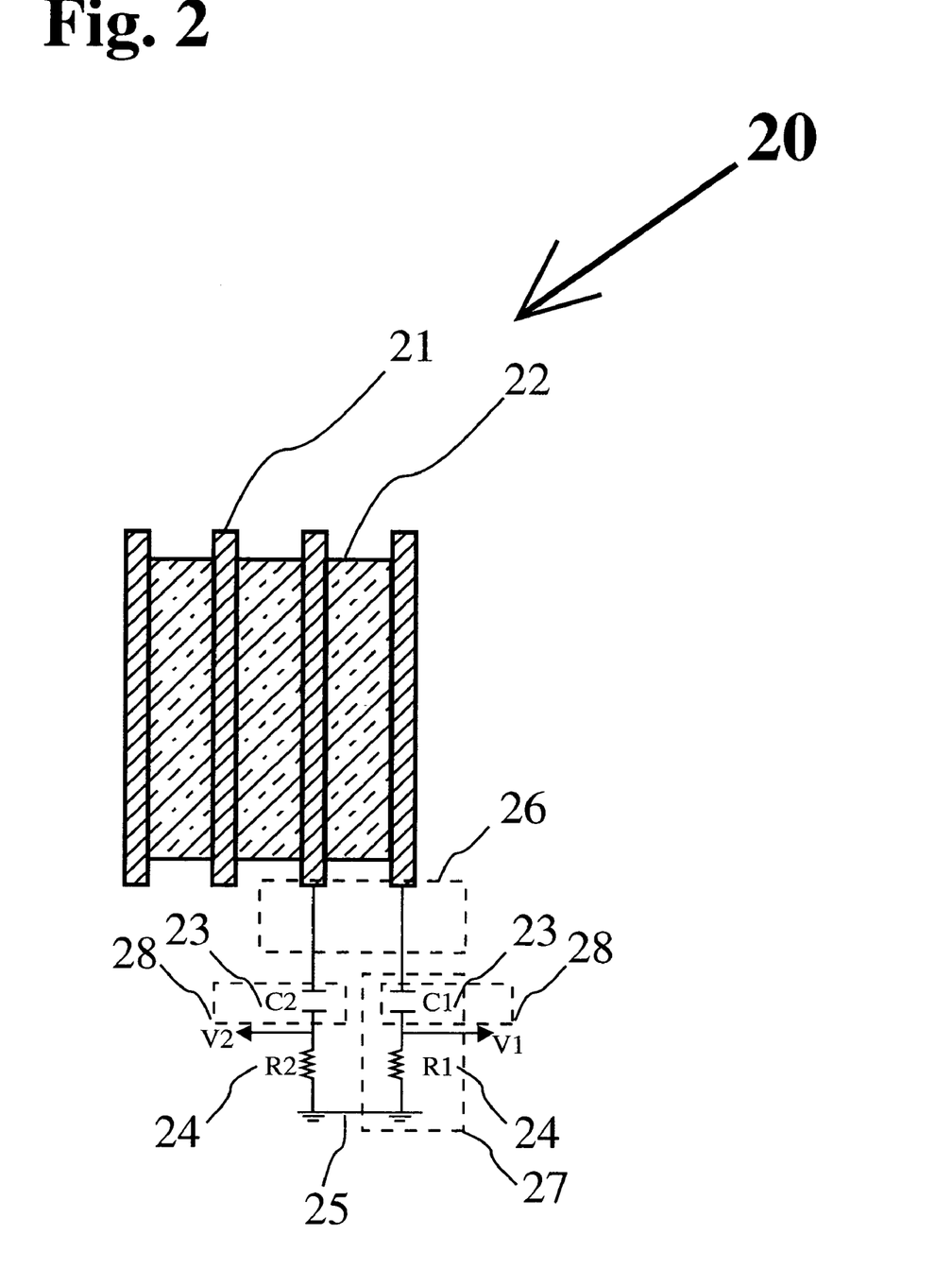
FIG. 2 is a schematic diagram depicting a lightning strike hazard detector having four collecting plates separated by three insulators, each set of the collecting plates being electrically connected.

The lightning strike hazard detector is schematically shown in FIG. 2 at 20. It uses a series of parallel collecting plates 21, which are isolated from each other by insulators 22, as shown and plates 21 are connected by connecting means 26 to a bleeding circuit 27. Preferably, at least one of said collecting plates has a plurality of apertures therein, as shown at 31 in FIG. 3, for facilitating penetration of charges therethrough. Charge penetration is enhanced when apertures occupy from about 30 to 50 percent of a plate's surface area. The capacitors 23 and current limiting resistors 24 connect each plate to the ground plane 25, acting as a controlled charge bleeding circuit 27. The bleeding circuit produces a current to ground, and the voltage at the resistor, which is the product of resistance times the current above the ground potential, is measured as V1, V2 etc by voltage measuring means shown in FIG. 4 at 44. This voltage is significantly smaller than the high voltage due to accumulated charges by the voltage accumulation means 28 at the plate of capacitor 23, and can be safely handled by electronic circuits. Voltage collected at the plate with the charge bleeding is indicated as V. For plate 1, the capacitor is C1, the resistor is R1 and the voltage measured is V1. A representative example depicting four plates is shown in FIG. 2.

Figure 3:
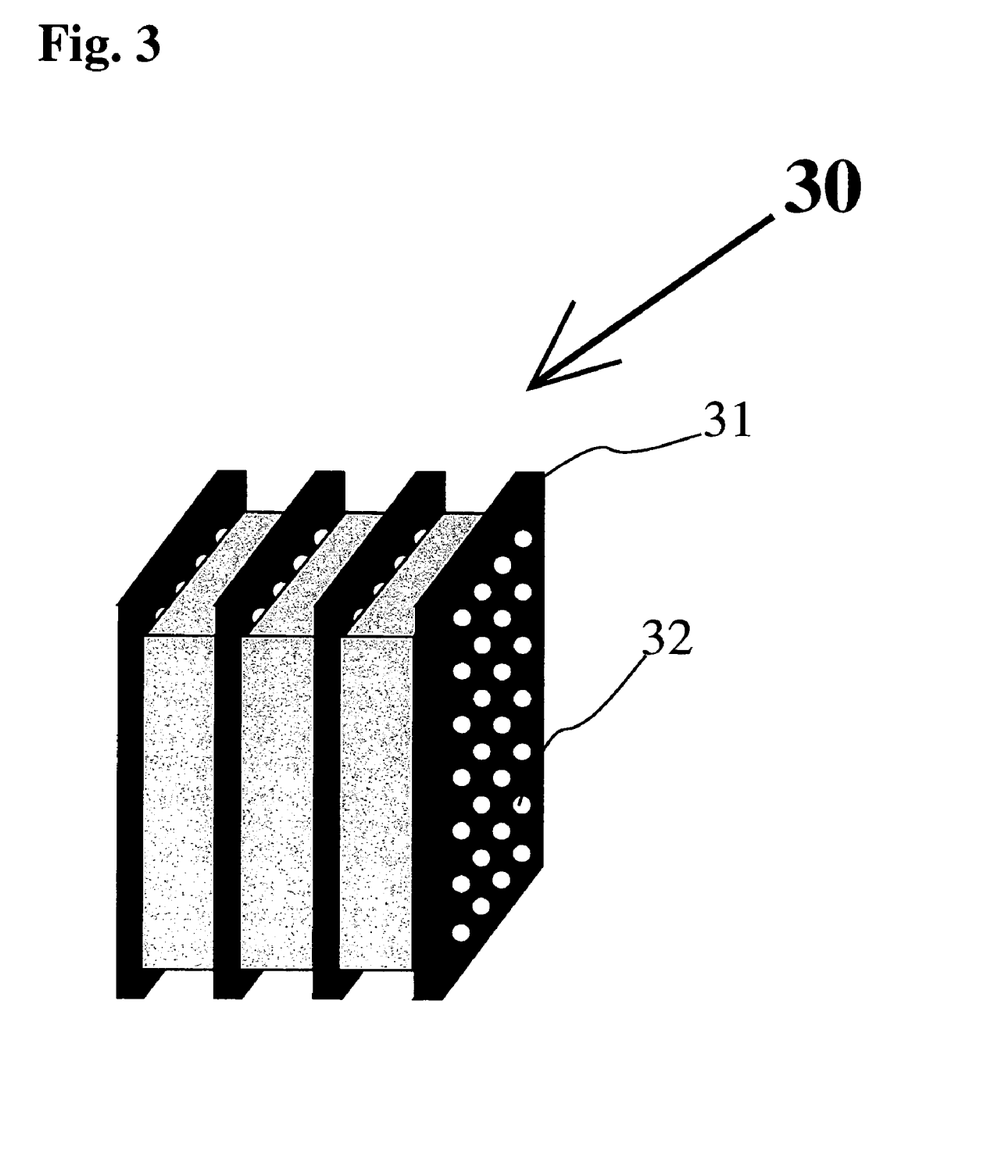
FIG. 3 is a schematic diagram of collecting plates separated by insulators, the plates having a plurality of apertures therein, to facilitate passage of positive and negative charges therethrough.

In FIG. 3 there is shown at 30 the collecting plates 31 provided with a plurality of apertures 32 arranged to facilitate passage of positive and negative charges therethrough. Charges readily pass through the plate stack for collection. The voltage gradient measured using the plates with a plurality of apertures is smaller than if collecting plate sets have no apertures, due to easy permeation of charges through the stack. Charge rate measurement is more sensitive, since the presence of the apertures causes the plates to collect more charges. Apertures are arranged on the collecting plates, so that there is an inexact alignment between apertures from one plate to the next. This inexact alignment of the apertures causes the charges to pass through the plate set easily.

Figure 4:
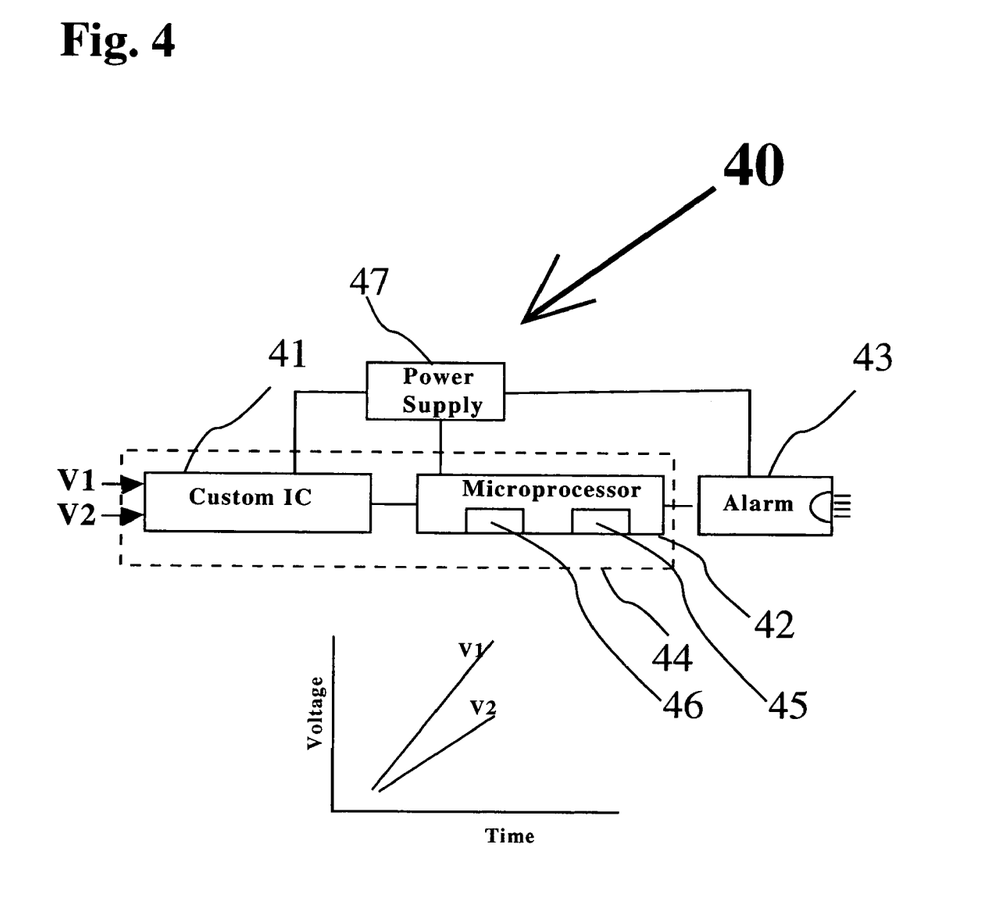
FIG. 4 is a schematic representation diagram of an electronic circuit for interpreting the measured voltages as a function of time.

FIG. 4 shows at 40 how the collected voltages are handled. Two of the plates (although n plates could be used) collect the voltages and feed the accumulated voltage to a custom microchip 41, which tracks the voltage as a function of time. The voltage is collected V1, V2 etc, as shown in FIG. 2, from a preselected location, which does not damage the microprocessor 42, powered by a power supply means 47. The bleeding circuit provides a robust voltage measurement. A time scale can be tracked in milliseconds, since the microprocessor collects data at the clock speed of the circuit and operate very rapidly. When negatively charged particles arrive at a rapid rate, one plate such as V1 charges at a much faster rate than the other plates, as shown by the schematic diagram of FIG. 4 depicting voltage/time data for plates 1 and 2. The microprocessor interprets by an algorithm means 46 resident within the microprocessor 42, the voltage/time data to determine arrival of negative charges, driving an alarm circuit 43 by the signal generating means 45 that is resident within the microprocessor 42. The voltage measuring means is shown at 44.

The operation of the lightning hazard detector is described hereinafter. When charged particles arrive at the collections of plates, they charge due to the impact of negatively charged particles. Each of the plates is individually connected to an identical discharge circuit, so that the charge can be bled equally. Unequal bleeding circuits may also be used and the microprocessor may be programmed to interpret these collected voltage/time data correctly. This "bleeding action" protects the electronic circuits from being exposed to very high voltages; yet provides means for determining the hazard potential. The detection circuit monitors the amount of charge in each plate and the speed at which the charge is accumulating, to determine the potential of the impacting negative charges to produce a ground based streamer. Outer plates charge to high voltages more rapidly than inner plates. Since the negatively charged particles approach at a high speed, the lightning detector must detect and sound a reliable alarm, affording sufficient time for a person wearing the detector to react by dropping to ground level, crouching or otherwise assuming a low, close-to-ground profile that minimizes lightning hazard or by performing some other action to minimize the chance of being struck. Reaction time provided by the lightning hazard detector typically ranges from fractions of seconds to up to twenty seconds or more depending on the rate of arrival of electrically charged particles to the detector.

Alternatively, a single collecting plate pair having good bleed capacity may be used. The amount of negative charge accumulated, comprising the voltage as a function of time, is measured. When this charge accumulation, together with rate of charge accumulation, is greater than a preselected value based on charge accumulation, accumulation rate and rate of charge bleed provided by the bleeding circuit, the advent of a lightning strike is indicated.

Figure 5:
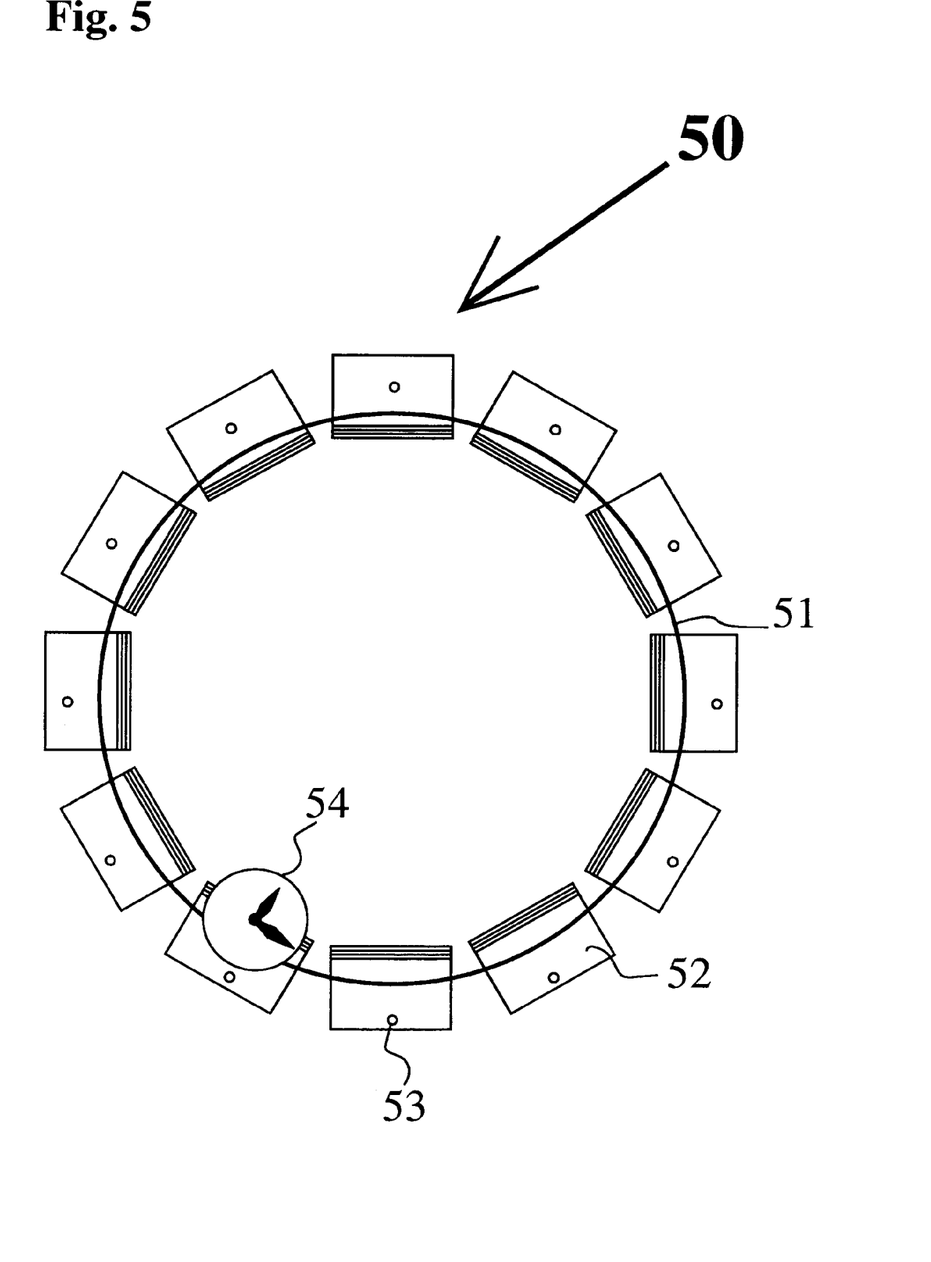
FIG. 5 is a schematic diagram depicting a bracelet that includes plural detection elements arranged to provide directionality of lightning strike hazard.

In a second embodiment, shown at 50 in FIG. 5, a bracelet having plural collecting plate sets 52 distributed tangentially around a bracelet 51, indicates at 53 the direction from which the charged negative ions are approaching. Due to the small size of each collecting plate, the set may be incorporated in a watch casing as shown at 54 or sets can be combined. The measuring electronics comprise a single microprocessor chip, which measures each stack independently, and is powered by a common power supply. The detection microprocessor may actuate a visible indicator 53 such as an LED or LCD to indicate the directionality. If one side of the bracelet charges more and the corresponding LEDs are lit, then it can be inferred that the charges are arriving from the LED lit side. It may also trigger an audible hazard signal. The bracelet provides directionality, targeting the approaching negative ion surge.

Figure 6:
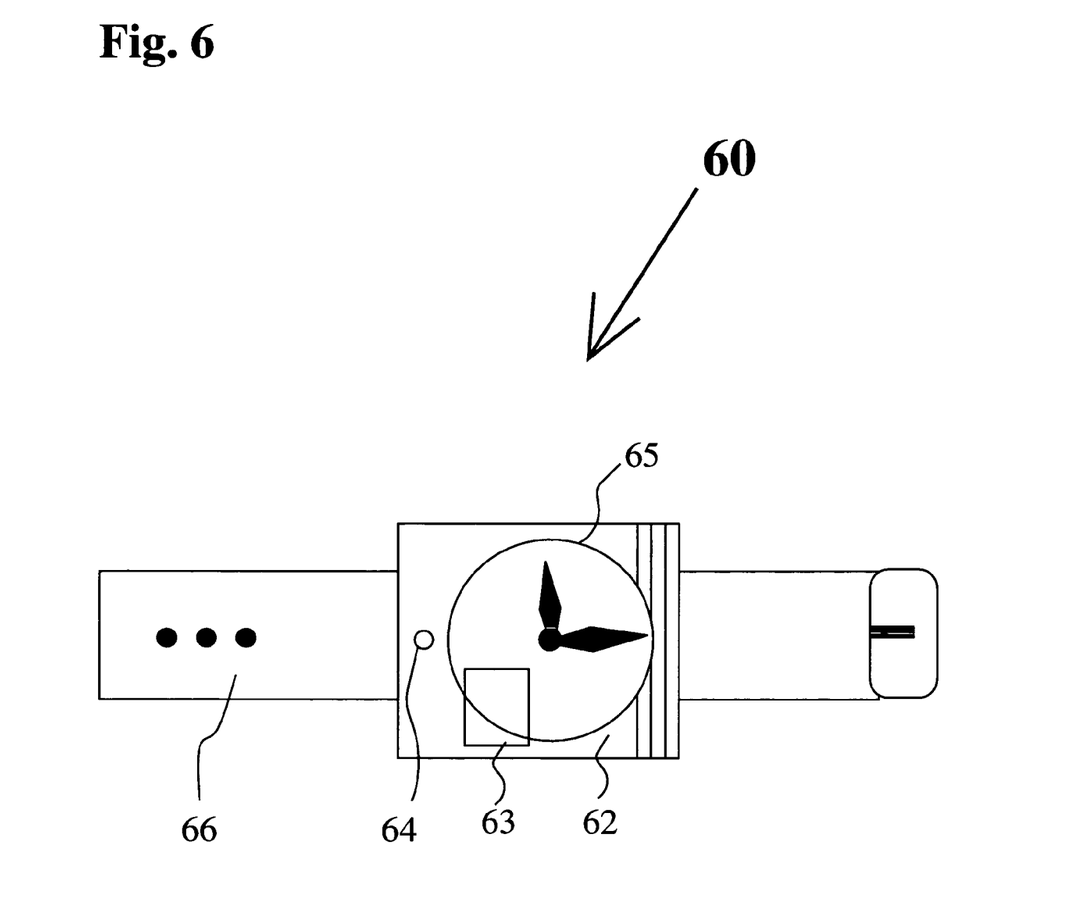
FIG. 6 is a schematic diagram depicting a watch provided with lightning hazard detection.

In FIG. 6, the general reference numeral 60 depicts a watch having a plurality of collecting plates 62 incorporated within the watch with electronic circuit with power supply as detailed in FIG. 4 referenced generally as 63. The arrival of charges is indicated by an LCD or LED 64. The standard watch mechanisms including hands, dial etc is shown at 65. The watch strap is shown at 66.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A wearable lightning-strike hazard detector, comprising:
   a. a plurality of collecting plates for collection of arriving charged particles;
   b. insulating means for insulating said collecting plates from each other;
   c. connecting means for electrically connecting said collecting plates to a bleeding circuit to bleed accumulated charges to a ground plane;
   d. voltage measuring means for determining the voltage within the bleeding circuit;
   e. voltage accumulation means for measuring voltage increase as a function of time;
   f. algorithm means for interpreting voltage and voltage/time data to determine lightning strike hazard potential;
   g. signal generating means connected to said algorithm means for generating a signal when said voltage and voltage accumulation rate exceed preselected limits;
   h. alarm means operative in response to said signal generating means for generating an alarm upon receipt of said signal.

2. A lightning-strike detector as recited by claim 1, comprising at least one pair of collecting plates.

3. A lightning-strike detector as recited by claim 1 wherein said bleeding circuit comprises means for bleeding said accumulated charges to said ground plane at a preselected bleeding rate.

4. A lightning-strike detector as recited by claim 3, wherein said bleeding circuit further comprises a capacitor and a current limiting resistor for limiting the bleeding rate.

5. A lightning-strike detector as recited by claim 4, further comprising microprocessor means for monitoring said voltage at a resistance provided by said current limiting resistance.

6. A lightning-strike detector as recited by claim 5, wherein said microprocessor comprises means for collecting said voltage and said voltage/time data from said plurality of collecting plates to determine lightning strike hazard potential.

7. A lightning-strike detector as recited by claim 1, comprising power supply means for providing on-board power.

8. A lightning-strike detector as recited by claim 1, wherein said detector is housed in a watch casing, for wearing on a wrist of a user.

9. A lightning-strike detector as recited by claim 8, wherein said watch casing additional houses components of said wristwatch.

10. A lightning-strike detector as recited by claim 1, wherein said detector is present in a wristwatch casing containing components of a wristwatch.

11. A lightning-strike detector as recited by claim 1, wherein at least one of said collecting plates has a plurality of apertures therein, for facilitating penetration of charges therethrough.

12. A lightning-strike detector as recited by claim 11, wherein said apertures occupy from about 30 to 50 percent of a plate's surface area.

13. A bracelet comprising a plurality of closely associated lightning strike hazard detectors for determining a direction from which a lightning strike hazard is approaching.

* * * * *